US012803093B2

(12) United States Patent
Yoon

(10) Patent No.: US 12,803,093 B2
(45) Date of Patent: Nov. 17, 2026

(54) BATTERY MODULE HAVING STRUCTURE IN WHICH EXTENSION IN VERTICAL DIRECTION IS EASY

(71) Applicant: LG ENERGY SOLUTION, LTD., Seoul (KR)

(72) Inventor: Sang Hyun Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 645 days.

(21) Appl. No.: 18/271,170

(22) PCT Filed: Dec. 13, 2022

(86) PCT No.: PCT/KR2022/020270

§ 371 (c)(1),
(2) Date: Jul. 6, 2023

(87) PCT Pub. No.: WO2023/121117

PCT Pub. Date: Jun. 29, 2023

(65) Prior Publication Data

US 2024/0055710 A1 Feb. 15, 2024

(30) Foreign Application Priority Data

Dec. 22, 2021 (KR) ........................ 10-2021-0185311

(51) Int. Cl.
*H01M 50/213* (2021.01)
*H01M 50/258* (2021.01)
(Continued)

(52) U.S. Cl.
CPC ....... *H01M 50/213* (2021.01); *H01M 50/258* (2021.01); *H01M 50/284* (2021.01); *H01M 50/505* (2021.01); *H01M 2220/10* (2013.01)

(58) Field of Classification Search
CPC ............. H01M 50/213; H01M 50/258; H01M 50/505; H01M 50/284; H01M 2220/10
See application file for complete search history.

(56) References Cited

U.S. PATENT DOCUMENTS

2006/0113965 A1* 6/2006 Jeon .................. H01M 10/6563 320/150
2012/0052352 A1* 3/2012 Brilmyer ............... H01M 50/51 429/94

(Continued)

FOREIGN PATENT DOCUMENTS

CN 105359295 A 2/2016
CN 105917496 A 8/2016

(Continued)

OTHER PUBLICATIONS

KR 20150116732 MT (Year: 2016).*

(Continued)

*Primary Examiner* — Alexander Usyatinsky

(74) *Attorney, Agent, or Firm* — Birch, Stewart, Kolasch & Birch, LLP

(57) ABSTRACT

A battery module includes a plurality of cylindrical battery cells, each of the plurality of cylindrical battery cells being provided at one side thereof with an electrode terminal for electrical connection with the outside, a frame configured to receive the plurality of cylindrical battery cells, a busbar configured to electrically connect the plurality of cylindrical battery cells to each other, a circuit board having various parts configured to control operation of the plurality of cylindrical battery cells mounted thereon, and a cylindrical module case configured to receive the plurality of cylindrical battery cells, the frame, the busbar, and the battery management circuit board. The plurality of cylindrical battery cells (Continued)

is disposed in a state of being laid down such that the electrode terminal faces a central part of the frame.

13 Claims, 3 Drawing Sheets

(51) Int. Cl.
*H01M 50/284* (2021.01)
*H01M 50/505* (2021.01)

(56) References Cited

U.S. PATENT DOCUMENTS

| | | | |
|---|---|---|---|
| 2015/0340672 | A1 | 11/2015 | Walpurgis |
| 2016/0336572 | A1 | 11/2016 | Yoshida et al. |
| 2018/0175348 | A1 | 6/2018 | Sugeno et al. |
| 2018/0190950 | A1* | 7/2018 | Zeng ................. H01M 10/0525 |
| 2021/0043895 | A1* | 2/2021 | Aoki ................... H01M 50/249 |
| 2022/0077534 | A1 | 3/2022 | Chandan et al. |
| 2022/0255145 | A1 | 8/2022 | Lee et al. |

FOREIGN PATENT DOCUMENTS

| | | | |
|---|---|---|---|
| CN | 113228392 | A | 8/2021 |
| CN | 214411364 | U | 10/2021 |
| JP | 2001-210295 | A | 8/2001 |
| JP | 2013-539178 | A | 10/2013 |
| JP | 2014-29960 | A | 2/2014 |
| JP | 2016-507872 | A | 3/2016 |
| JP | 2017-143082 | A | 8/2017 |
| JP | 2019-114389 | A | 7/2019 |
| JP | 2019-133884 | A | 8/2019 |
| JP | 2020-47452 | A | 3/2020 |
| KR | 10-0709180 | B1 | 4/2007 |
| KR | 10-0805108 | B1 | 2/2008 |
| KR | 10-2011-0133987 | A | 12/2011 |
| KR | 10-1168598 | B1 | 7/2012 |
| KR | 10-2013-0075404 | A | 7/2013 |
| KR | 10-2013-0105617 | A | 9/2013 |
| KR | 10-2015-0116732 | A | 10/2015 |
| KR | 20150116732 | * | 10/2015 |
| KR | 10-1604388 | B1 | 3/2016 |
| KR | 10-2019-0099066 | A | 8/2019 |
| KR | 10-2020-0003582 | A | 1/2020 |
| KR | 10-2021-0080256 | A | 6/2021 |
| KR | 10-2316488 | B1 | 10/2021 |

OTHER PUBLICATIONS

The decision of JPO to grant a Patent for Application JP 2023538145 (Year: 2024).*

Extended European Search Report for European Application No. 22911750.2, Nov. 18, 2024.

International Search Report (PCT/ISA/210) issued in PCT/KR2022/020270, dated Mar. 20, 2023.

* cited by examiner

【FIG. 1】
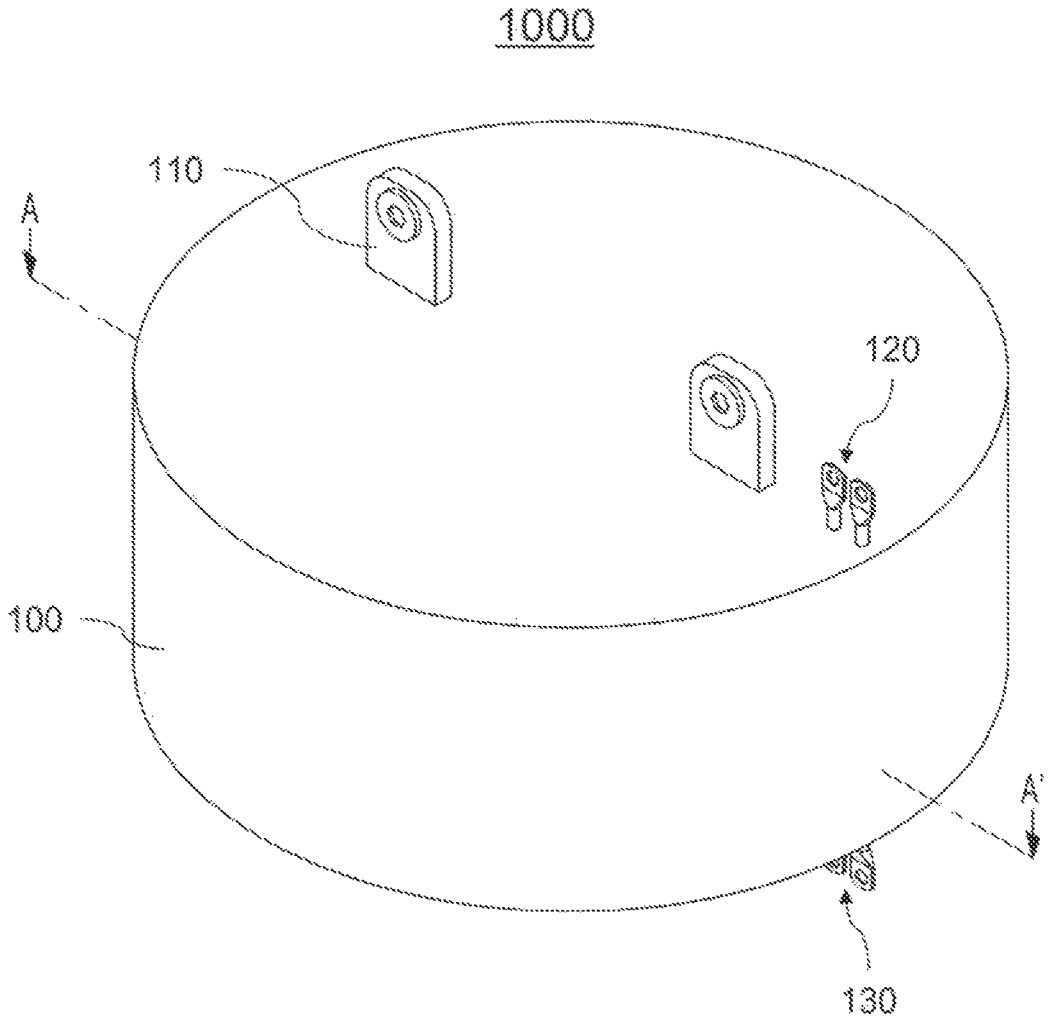

【FIG. 2】
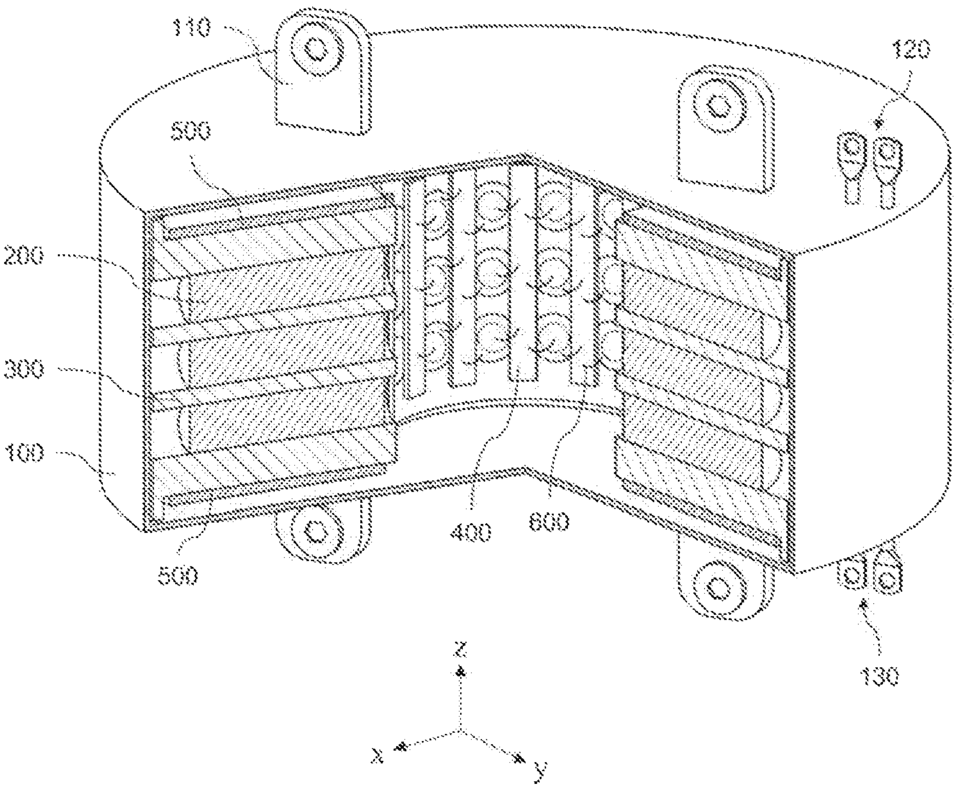
【FIG. 3】
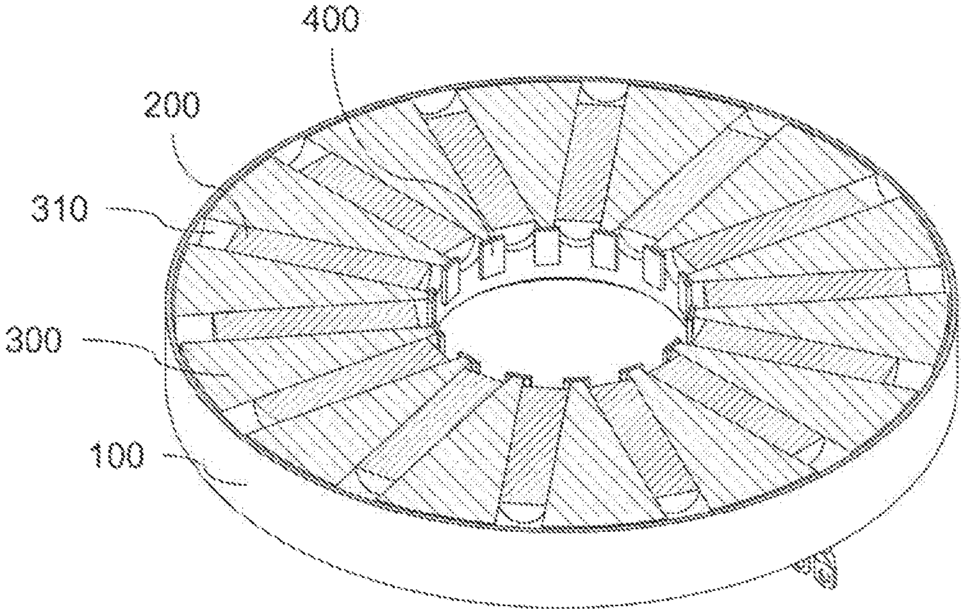

【FIG. 4】
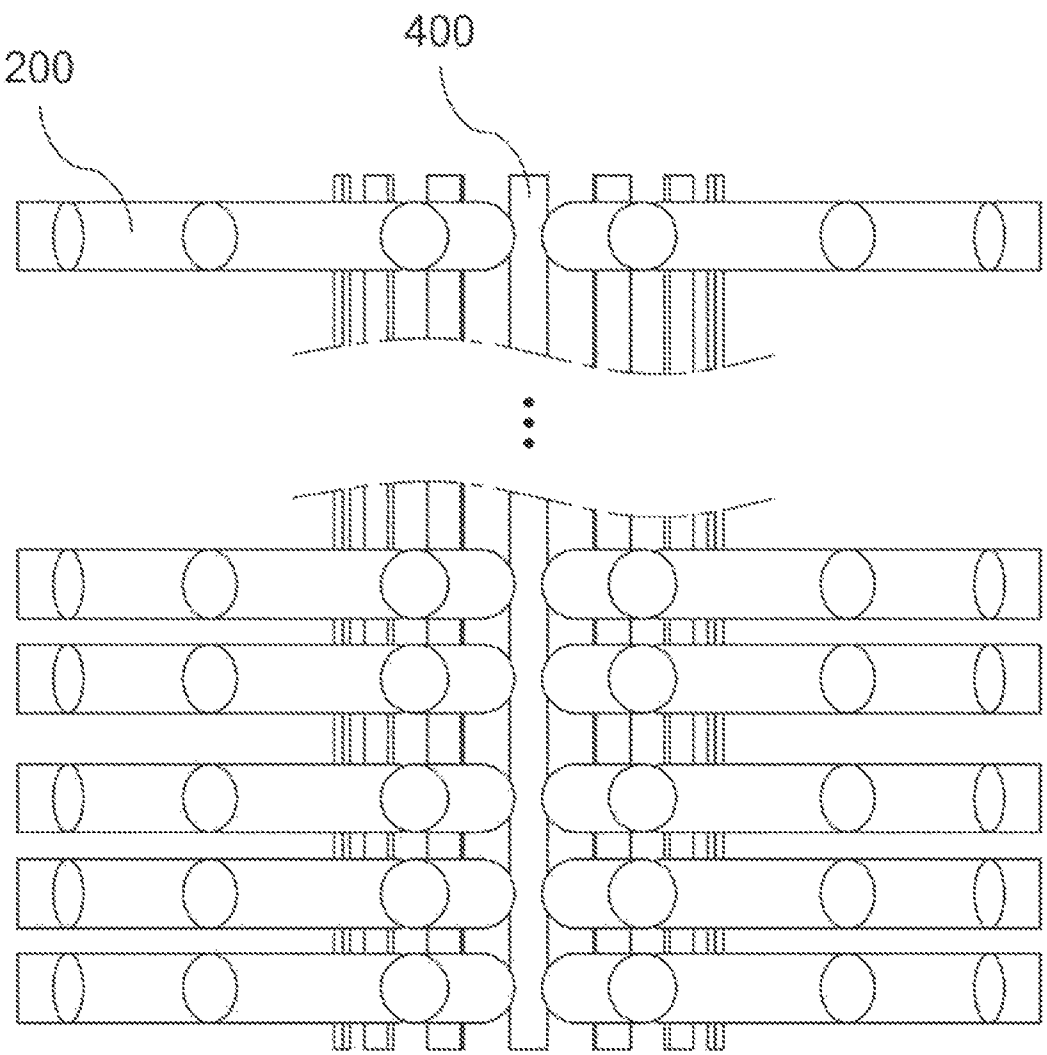

BATTERY MODULE HAVING STRUCTURE IN WHICH EXTENSION IN VERTICAL DIRECTION IS EASY

TECHNICAL FIELD

This application claims the benefit of priority to Korean Patent Application No. 2021-0185311 filed on Dec. 22, 2021, the disclosure of which is incorporated herein by reference in its entirety.

The present invention relates to a battery module having a structure in which a cylindrical battery cell is disposed in a cylindrical module case in a horizontal direction, whereby extension in a vertical direction is easy.

BACKGROUND ART

With technological development of mobile devices, such as smartphones, laptop computers, and digital cameras, and an increase in demand therefor, research on secondary batteries, which are capable of being charged and discharged, has been actively conducted. In addition, a new and renewable energy field, such as solar energy and wind energy, has further attracted attention in order to respond to environmental issues, such as global warming, in recent years.

Secondary batteries are applied to an energy storage system (ESS) that stores power produced in the new and renewable energy field, and are also essential for an electric vehicle (EV) substituting for fossil fuel-based internal combustion engine vehicles causing air pollution.

There are a lithium ion battery, a lithium polymer battery, a nickel cadmium battery, a nickel hydride battery, and a nickel zinc battery as secondary batteries that are widely used at present. The operating voltage of a unit secondary battery cell, i.e. a unit battery cell, is about 2.0 V to 5.0 V. When output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. Furthermore, a battery pack is generally manufactured using at least one battery module by adding an additional component.

In particular, wind power is generated on a large scale in Europe, etc. due to an advantage in that power is generated using wind, which is a clean energy source.

However, new and renewable energy sources, such as wind power generation and photovoltaic generation, are characterized in that the production amount of power is not uniform, compared to existing thermal power generation or nuclear power generation, and the production amount of power is greatly changed due to environmental factors, such as season and weather.

In order to overcome lowering of efficiency due to irregular power generation, therefore, a method of storing power produced by the new and renewable energy sources in the energy storage system (ESS) and using the stored power when necessary is used.

The energy storage system includes a plurality of battery cells and a management system. Conventionally, the energy storage system is generally provided and used separately from a wind power generator. In this case, however, there is a problem in that separate equipment is necessary.

In addition, as disclosed in Patent Document 1, one main ESS and a plurality of subsidiary ESSs provided respectively at individual wind power generators may be provided and operated.

At this time, each subsidiary ESS may be installed adjacent to a corresponding one of the wind power generators or may be installed in a tower of the wind power generator.

When the ESS is installed in an inner space of the tower, as in Patent Document 1, no separate storage equipment for the subsidiary ESS is necessary. However, an ordinary battery module used in the conventional ESS is not suitable for the shape of the tower. Particularly, when the wind power generator is small, space utilization is low, and therefore it is difficult to install a battery module having sufficient capacity in the wind power generator.

PRIOR ART DOCUMENT (Patent Document 1) Korean Patent Application Publication No. 2020-0003582

DISCLOSURE

Technical Problem

The present invention has been made in view of the above problems, and it is an object of the present invention to provide a battery module having a structure in which a plurality of cylindrical battery cells is disposed in a cylindrical module case in a state of being laid down in a horizontal direction and electrode terminals of the plurality of cylindrical battery cells are located in a central part of the module case, whereby extension in a vertical direction is easy.

Technical Solution

A battery module according to the present invention to accomplish the above object includes a plurality of cylindrical battery cells, each of the plurality of cylindrical battery cells being provided at one side thereof with an electrode terminal for electrical connection with the outside, a frame configured to receive the plurality of cylindrical battery cells, a busbar configured to electrically connect the plurality of cylindrical battery cells to each other, a circuit board configured to control operation of the plurality of cylindrical battery cells, and a cylindrical module case configured to receive the plurality of cylindrical battery cells, the frame, the busbar, and circuit board, wherein each of the plurality of cylindrical battery cells is disposed in a state of being laid down such that the electrode terminal faces a central part of the frame.

Also, in the battery module according to the present invention, the plurality of cylindrical battery cells may be radially or circularly disposed.

Also, in the battery module according to the present invention, the frame may be formed such that the plurality of cylindrical battery cells has a multilayered structure.

Also, in the battery module according to the present invention, the module case may be provided at an outside thereof with a fixing portion configured to mechanically fix the battery module to an external device.

Also, in the battery module according to the present invention, the fixing portion may be provided at each of an upper part and a lower part of the module case.

Also, in the battery module according to the present invention, the module case may be provided at the outside thereof with a charge current end configured to allow the battery module to be charged with current and a use current end configured to allow current to be drawn from the battery module.

Also, in the battery module according to the present invention, the charge current end and the use current end may be located at the upper part and the lower part of the module case, respectively.

Also, in the battery module according to the present invention, the busbar may be provided in plural so as to connect the plurality of cylindrical battery cells.

Also, in the battery module according to the present invention, the electrode terminal of each of the plurality of cylindrical battery cells and the busbar may be electrically connected to each other by wire bonding.

In addition, the present invention provides a device including the battery module.

Also, the device according to the present invention may be a wind power generator.

The plurality of cylindrical battery cells may be formed in a plurality of layers, and cylindrical battery cells of the plurality of layers may be aligned in a vertical direction.

Advantageous Effects

A battery module according to the present invention has a merit in that the external shape of the battery module is cylindrical, whereby space utilization is improved when the battery module is mounted in cylindrical equipment, such as a tower of a wind power generator.

In addition, the battery module according to the present invention has a merit in that cylindrical battery cells are located in a horizontal direction and are radially or circularly disposed such that electrode terminals of the cylindrical battery cells face a central part of the battery module, whereby extension in a vertical direction is easy.

DESCRIPTION OF DRAWINGS

FIG. 1 is a perspective view schematically showing a battery module according to an embodiment of the present invention.

FIG. 2 is a partial cutaway perspective view of the battery module according to the embodiment of the present invention.

FIG. 3 is a horizontal sectional view of the battery module according to the present invention taken along line A-A' of FIG. 1.

FIG. 4 is a view showing only a plurality of cylindrical battery cells and a busbar separated from the battery module according to the embodiment of the present invention.

BEST MODE

In the present application, it should be understood that the terms “comprises,” “has,” “includes,” etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module according to the present invention will be described with reference to the accompanying drawings.

FIG. 1 is a perspective view schematically showing a battery module according to an embodiment of the present invention, FIG. 2 is a partial cutaway perspective view of the battery module according to the embodiment of the present invention, FIG. 3 is a horizontal sectional view of the battery module according to the present invention taken along line A-A' of FIG. 1, and FIG. 4 is a view showing only a plurality of cylindrical battery cells and a busbar separated from the battery module according to the embodiment of the present invention.

When describing the battery module 1000 according to the present invention with reference to FIGS. 1 to 4, the battery module 1000 according to the present invention includes a module case 100, cylindrical battery cells 200, a frame 300, a busbar 400 configured to connect the cylindrical battery cells 200 to each other in series or in parallel, a circuit board 500, and a bonding wire 600 configured to electrically connect each of the cylindrical battery cells 200 to the busbar 400.

First, the cylindrical battery cells 200, the frame 300, the busbar 400, and the circuit board 500 are received in the module case 100, which protects the above components from external impact. The module case has a cylindrical shape.

The diameter of the section of the module case 100 may be appropriately selected depending on equipment in which the battery module 1000 according to the present invention is to be mounted.

In addition, the module case 100 is provided at an outer upper part and/or an outer lower part thereof with a fixing portion 110 configured to fix the battery module 1000 to the equipment by mechanical fastening using bolts and nuts.

The battery module may be easily fixed to a desired place, such as the interior of a tower of a wind power generator, using the fixing portion 110.

In addition, the module case 100 is provided at the outer upper part and the outer lower part thereof with a charge current end 120 electrically connected to the equipment in which the battery module 1000 is mounted, the charge current end 120 being configured to allow the battery module 1000 to be charged therethrough, and a use current end 130 configured to allow current to be drawn from the charged battery module 1000 therethrough.

In the present invention, a description is given based on the case in which the fixing portion 110 and the charge current end 120 are located at the upper part of the module case and the use current end 130 is located at the lower part of the module case, as shown in the drawings. However, the positions of the charge current end 120 and the use current end 130 as well as the fixing portion 110 may be appropriately selected based on the equipment in which the battery module 1000 is to be mounted.

Next, a plurality of cylindrical battery cells 200 is provided in the battery module 1000 according to the present invention.

Based on the shape of a case, a battery cell may be generally classified as a can-shaped battery cell, configured to have a structure in which an electrode assembly is mounted in a metal can, or a pouch-shaped battery cell, configured to have a structure in which an electrode assembly is mounted in a pouch made of a laminated sheet. The cylindrical battery cell 200 means a battery cell having a cylindrical metal can.

The cylindrical battery cell 200 may include a cylindrical battery can, an electrode assembly received in the battery can, and a cap assembly coupled to an upper part of the battery can.

The cylindrical battery cell 200 of the present invention is provided at one side thereof with an electrode terminal for electrical connection with the outside.

Here, that the electrode terminal is provided at one side of the cylindrical battery cell 200 means that both a positive electrode and a negative electrode of the cylindrical battery cell can be connected to the busbar 400 in the same plane.

The reason for this is that the busbar 400 and the cylindrical battery cell 200 can be electrically connected to each other in the same plane, whereby it is possible to easily extend the battery module 1000 in a vertical direction by stacking the cylindrical battery cells 200, although the reason will be described below in detail.

The frame 300 serves to fix the cylindrical battery cell 200, to prevent short circuit between neighboring cylindrical battery cells 200, and to protect the cylindrical battery cells from impact. The frame may be made of a plastic material, which is electrically insulative and is easily formed into a complex shape.

The external shape of the frame 300 is cylindrical, in the same manner as the module case 100. The frame is provided with a cell insertion space 310, into which the cylindrical battery cell 200 is inserted, and a central part of the frame is empty.

Meanwhile, as shown in FIGS. 2 to 4, in the battery module 1000 according to the present invention, the cylindrical battery cell 200 is disposed in a horizontal direction.

Here, that the cylindrical battery cell 200 is disposed in the horizontal direction means that the cylindrical battery cell 200, which has a long cylindrical shape with a predetermined height, is located in a state of being laid down in a direction parallel to a bottom surface of the battery module 1000, as shown in FIGS. 2 to 4.

In the frame 300, therefore, the cell insertion space 310, in which each cylindrical battery cell 200 is located, has a hollow cylindrical shape, which is identical to the outer shape of the cylindrical battery cell 200, which is effective in terms of fixing the cylindrical battery cell 200 and preventing impact.

In addition, the plurality of cylindrical battery cells 200 located in the horizontal direction is disposed such that one side of each of the cylindrical battery cells, at which the electrode terminal is located, faces the central part of the frame 300.

That is, in the battery module 1000 according to the present invention, the cylindrical battery cells 200 may be radially or circularly disposed in a state of being laid down such that the electrode terminal of each of the cylindrical battery cells faces the central part in a plane defined by an x-axis and a y-axis (an xy plane), as shown in FIG. 2.

The cylindrical battery cells 200 may be radially or circularly disposed in a state of being laid down while forming a predetermined angle with the plane. Preferably, the cylindrical battery cells 200 are disposed in a state of being laid down while forming a vertical angle less than 90 degrees with the plane. More preferably, the cylindrical battery cells 200 are disposed in a state of being laid down while forming a vertical angle less than 45 degrees with the plane.

Here, that cylindrical battery cells are radially disposed and that cylindrical battery cells are circularly disposed are similar to each other in terms of the fact that the cylindrical battery cells 200 are disposed such that the electrode terminals of the cylindrical battery cells face the central part in the state in which the cylindrical battery cells 200 are laid down but are different from each other since that cylindrical battery cells are radially disposed means that the intervals between the cylindrical battery cells 200 are equal to each other and that cylindrical battery cells are circularly disposed means that the intervals between the cylindrical battery cells 200 are not equal to each other.

Of course, the present invention is not limited thereto. The cylindrical battery cells 200 may be variously disposed as long as the electrode terminals face the central part in the xy plane, and the cylindrical battery cells 200 may be disposed in an inclined state in addition to the case in which the cylindrical battery cells are laid down in exact parallel to the bottom surface (the xy plane).

The reason that the cylindrical battery cells 200 are disposed such that the electrode terminals of the cylindrical battery cells face the central part is that the plurality of cylindrical battery cells 200 is electrically connected to the busbar 400 using a method using the bonding wire 600 and the cylindrical battery cells can be easily electrically connected to the busbar 400 when the electrode terminals of the cylindrical battery cells are concentrated in the central part of the frame 300.

Also, in the battery module 1000 according to the present invention, the cylindrical battery cells 200 may be provided so as to have a multilayered structure depending on desired capacity and size. Even in this case, the frame 300 may be easily formed using a method, such as injection molding, such that the cylindrical battery cells 200 can be stacked so as to have a multilayered structure.

Here, that the cylindrical battery cells are stacked so as to have a multilayered structure means that the layer of the cylindrical battery cells 200 disposed in the xy plane, as described above, is repeatedly stacked along a z-axis.

When the electrode terminals of the cylindrical battery cells 200 are aligned in the z-axis direction at the time of stacking, electrical connection of the cylindrical battery cells to the busbar 400 may be easily achieved.

Even though the cylindrical battery cells 200 are disposed so as to have a multilayered structure, as described above, the cylindrical battery cells 200 are located in the horizontal direction and the electrode terminals of the cylindrical battery cells are concentrated in the central part of the frame 300, as described above, whereby electrical connection of the cylindrical battery cells to the busbar 400 is easily achieved.

Consequently, it is possible to easily select the capacity and the size of the battery module 1000 based on the number of layers formed by the cylindrical battery cells 200 in the battery module 1000.

That is, the battery module 1000 according to the present invention has a structure in which extension in the vertical direction (the z-axis direction) is easy.

Meanwhile, various kinds of parts configured to control the operation of the cylindrical battery cells 200 in the battery module 1000 and to sense the voltage of the cylindrical battery cells are mounted on the circuit board 500, and one or more circuit boards may be provided in the battery module 1000.

When describing a method of manufacturing the battery module 1000 according to the present invention described above, the method of manufacturing the battery module 1000 includes a) a step of molding a frame 300 having a cell insertion space 310 formed therein, b) a step of inserting a cylindrical battery cell 200 into the cell insertion space 310 of the frame 300 such that electrode terminals of the cylindrical battery cell face a central part of the frame 300, c) a step of positioning a busbar 400, d) a step of electrically connecting the busbar 400 and the cylindrical battery cell 200 to each other via a bonding wire 600, e) a step of receiving the frame 300 having the cylindrical battery cell 200 inserted thereinto in a module case 100, and f) a step of positioning a circuit board.

Of course, any of various known methods may be used as a method of electrically connecting the busbar 400 and the cylindrical battery cell 200 to each other in step d) in addition to the method using the bonding wire 600 described in the present invention.

The battery module 1000 thus manufactured may be used as a power supply source for various kinds of apparatuses or to store power.

In particular, the battery module 1000 according to the present invention manufactured so as to have a cylindrical shape may be mounted in cylindrical equipment, such as a tower of a wind power generator, whereby it is possible to improve space utilization.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

1000: Battery module
100: Module case
110: Fixing portion
120: Charge current end
130: Use current end
200: Cylindrical battery cell
300: Frame
310: Cell insertion space
400: Busbar
500: Circuit board
600: Bonding wire

The invention claimed is:

1. A battery module comprising:
a plurality of cylindrical battery cells, each of the plurality of cylindrical battery cells being provided at one side thereof with an electrode terminal for electrical connection with an outside;
a frame configured to receive the plurality of cylindrical battery cells;
a busbar configured to electrically connect the plurality of cylindrical battery cells to each other;
a plurality of bonding wires configured to electrically connect the plurality of cylindrical battery cells to the busbar;
a circuit board configured to control operation of the plurality of cylindrical battery cells; and
a cylindrical module case configured to receive the plurality of cylindrical battery cells, the frame, the busbar, and the circuit board,
wherein each of the plurality of cylindrical battery cells is disposed in a state of being laid down such that the electrode terminal faces a central part of the frame.

2. The battery module according to claim 1, wherein the plurality of cylindrical battery cells is radially or circularly disposed.

3. The battery module according to claim 2, wherein the frame is formed such that the plurality of cylindrical battery cells has a multilayered structure.

4. The battery module according to claim 3, wherein the module case is provided at an outside thereof with a fixing portion configured to mechanically fix the battery module to an external device.

5. The battery module according to claim 4, wherein the fixing portion is provided at each of an upper part and a lower part of the module case.

6. The battery module according to claim 3, wherein the module case is provided at an outside thereof with a charge current end configured to allow the battery module to be charged with current and a use current end configured to allow current to be drawn from the battery module.

7. The battery module according to claim 6, wherein the charge current end and the use current end are located at an upper part and a lower part of the module case, respectively.

8. The battery module according to claim 3, wherein the busbar is provided in plural so as to connect the plurality of cylindrical battery cells to each other in a vertical direction.

9. The battery module according to claim 8, wherein the electrode terminal of each of the plurality of cylindrical battery cells and the busbar are electrically connected to each other by the bonding wires.

10. A device comprising the battery module according to claim 1.

11. The device according to claim 10, wherein the device is a wind power generator.

12. The battery module according to claim 1, wherein the plurality of cylindrical battery cells are formed in a plurality of layers, and
wherein cylindrical battery cells of the plurality of layers are aligned in a vertical direction.

13. The battery module according to claim 8, wherein the plurality of busbars extend in parallel perpendicular to a radial direction of the plurality of cylindrical battery cells.

* * * * *